US005505621A

United States Patent [19]
Lamphiear

[11] Patent Number: 5,505,621
[45] Date of Patent: Apr. 9, 1996

[54] CHANGEABLE GLOBE UNIT

[76] Inventor: Gene Lamphiear, 1105 Longview Ave., Anacortes, Wash. 98221

[21] Appl. No.: 377,615

[22] Filed: Jan. 25, 1995

[51] Int. Cl.$^6$ .................................................. G09B 27/08
[52] U.S. Cl. .......................................... 434/137; 434/131
[58] Field of Search ..................... 434/130, 131, 434/132, 137, 146, 147; D19/61

[56] References Cited

U.S. PATENT DOCUMENTS

| D. 112,610 | 12/1938 | Margo | D19/614 |
|---|---|---|---|
| D. 119,695 | 3/1940 | Clark | D19/61 |
| D. 162,367 | 3/1951 | Woofter | D19/614 |
| D. 243,201 | 1/1977 | Wrenn | D19/61 |
| D. 249,534 | 9/1978 | Denney | D19/61 |
| 888,854 | 5/1908 | Sheldon | 434/132 |
| 3,037,300 | 6/1962 | Grosser | 434/147 |
| 3,055,124 | 9/1962 | Gilmer, Jr. et al. | 434/132 |
| 3,063,163 | 11/1962 | Dukes, Jr. | 434/131 |

OTHER PUBLICATIONS

Machine Mounted Globes, Model No. 1278, School Buyers Guide, Beckley–Cardy Co., Chicago, IL, 1959–1960, p. 72.
Models No. H202/CF550 And H202/CF551 (Card Holders), D. G. Williams, Inc. (Catalog), New York, NY, Sep. 1968, p. 12.
"Tru–Vue—Two Globes in One", Weber Costello (Catalog), Chicago Heights, IL, Dec. 1, 1958.

*Primary Examiner*—Gene Mangene
*Assistant Examiner*—Jeffrey A. Smith
*Attorney, Agent, or Firm*—Terry M. Gernstein

[57] ABSTRACT

A globe unit includes a globe element having basic geographical indicia thereon and which is supported on a stand unit. The globe unit further includes a plurality of hemispherical covers, each of which has markings thereon which depict geographic, historic, political or scientific information. The covers are releasably mounted on the globe element by means of a tab on the globe element frictionally engaging the covers adjacent to slots in the covers.

5 Claims, 1 Drawing Sheet

U.S. Patent            Apr. 9, 1996            5,505,621
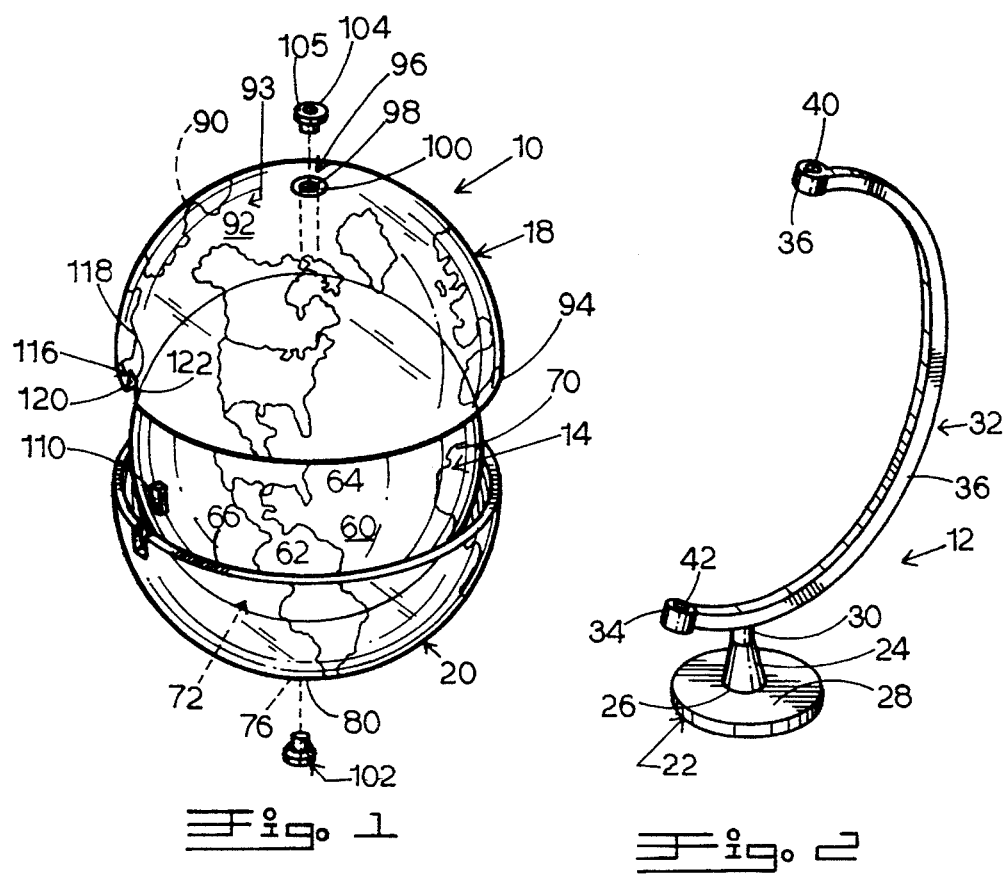
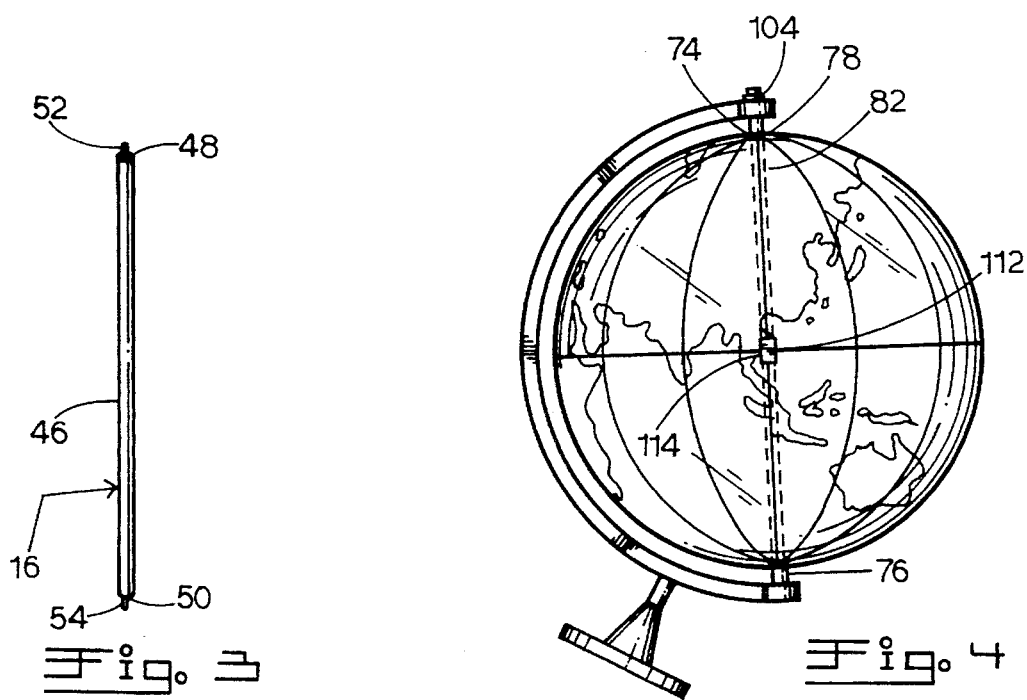

ant fuh5,505,621

CHANGEABLE GLOBE UNIT

TECHNICAL FIELD OF THE INVENTION

The present invention relates to the general art of teaching and educational devices, and to the particular field of globes.

BACKGROUND OF THE INVENTION

As is well known in the art, geography is an extremely important subject for all students as well as those interested in understanding a particular historical or political event. As is well known, visualizing an event and placing the event in context of geography is a valuable tool in understanding and remembering the event. For this reason, many history, political and science courses and studies include a discussion of the geography pertinent to the study.

Accordingly, the art has included many visual aids for assisting someone in this visualization process. Aids such as maps, globes, projections and the like are known in the art. While maps and projections are helpful, many cases require a three dimensional visual aid to be fully effective. For this reason, many such aids use globes.

However, as is also well known, a single globe may not be sufficient for all purposes. For example, a globe divided according to political factors is not always helpful in understanding environmental factors, such as weather, or the like. Also, a globe divided according to current political boundaries may not be helpful in understanding a historical event.

In fact, current political boundaries may change quickly, thereby quickly outdating a globe showing boundaries and geographical data that depends on political boundaries.

Therefore, there is a need for a globe that can be modified according to the subject of interest.

While the art does include globes that can be changed, these globes may not be easily and quickly changed from one display to another. The currently-available globes that can be altered often require a great deal of dexterity to effect a change from one display to another. This presents a drawback to a teacher who may have to interrupt a presentation to grapple with a globe, or may be extremely detrimental if the teacher asks a student to make a presentation. This is particularly onerous if the student happens to be quite young or nervous.

Therefore, there is a need for a globe that can be quickly and easily changed from one display to another yet will be accurate when set up.

OBJECTS OF THE INVENTION

It is a main object of the present invention to provide a changeable globe.

It is another object of the present invention to provide a changeable globe which is easily and accurately set up and changed from one display to another.

SUMMARY OF THE INVENTION

These, and other, objects are achieved by a globe unit having a plurality of hemispherical covers that fit over a globe element and which have various geographical markings thereon. The unit includes means for quickly and easily fastening the covers to the globe element in proper position to accurately depict a particular display. The covers can be easily removed and replaced as necessary and will be securely held in position.

The unit includes a fastening means for holding the covers on the globe element. The fastening means includes a tab on the globe element to be bisected by the equator of the globe element, slots in each of the covers that are sized and located to snugly receive the tab as well as means for attaching the globe and covers to a stand unit via an axle which is releasably attached to the stand unit.

BRIEF DESCRIPTION OF THE DRAWING FIGURES

FIG. 1 is an exploded perspective view showing the globe element and two hemispherical covers of the globe unit embodying the present invention.

FIG. 2 is a perspective view of a stand unit of the globe unit.

FIG. 3 is an elevational view of an axle of the globe unit of the present invention.

FIG. 4 is a side elevational view showing the globe unit in an assembled condition.

DETAILED DESCRIPTION OF THE PREFERRED EMBODIMENT OF THE INVENTION

Shown in the Figures is a changeable globe unit 10 which includes a support stand unit 12 having a printed geographic globe 14 supported thereon by an axle 16, with a translucent northern hemispherical cover 18 and a translucent southern hemispherical cover 20 releasably mounted on the globe element by a fastening means which permits rapid, accurate and easy assembly of the overall unit 10 using one of a plurality of northern hemispherical covers and one of a plurality of southern hemispherical covers.

More specifically, as is best shown in FIG. 2, support stand unit 12 includes a base means 22 for supporting the base unit, and hence the overall globe unit, on a support surface, such as a desk or the like. A pedestal 24 has a proximal end 26 fixedly mounted on upper surface 28 of base means 22, and extends upwardly therefrom when the base means is on a supporting surface. Pedestal 24 also includes a distal end 30 spaced above proximal end 26 and to which is attached a support rib 32. Support rib 32 includes a bottom end 34 located adjacent to distal end 30 of pedestal 24, a top end 36 spaced from bottom end 34 and an arcuate body 36 connecting the top end to the bottom end. As shown, pedestal 24 is connected to arcuate body 36 near bottom end 34 so top end 36 is located above and spaced from the bottom end. Support rib 32 further includes a top bore 40 defined through top end 36 and a bottom bore 42 defined through bottom end 34.

As best shown in FIG. 3, axle 16 includes a cylindrical body section 46 having an outer diameter, a first end 48 and a second end 50. A first cylindrical element 52 is fixed to first end 48 to extend outwardly from end 48 along the central longitudinal axis of body 46, and a second cylindrical element 54 is fixed to second end 50 to extend outwardly from end 50 along the central longitudinal axis of body 46 whereby elements 46, 52 and 54 are all axially aligned with each other. Elements 52 and 54 have outer diameters that are equal to each other and less than the outer diameter of body 46 whereby a shoulder is defined around each cylindrical element where it joins body 46.

As is best shown in FIGS. 1 and 4, globe element 14 is spherical and includes an outer surface 60 on which basic geographic indicia, such as land mass 62 and water mass 64, are printed. An equator 66 extends laterally around the globe element and longitudinally divides the globe element into two equal hemispheres, a northern hemisphere 70 and a southern hemisphere 72. A north pole 74 is located at the center of the northern hemisphere surface, and a south pole 76 is located at the center of the southern hemisphere surface in locations that correspond to the north and south poles on a globe. A north bore 78 is defined through the globe element at north pole 74 and a south bore 80 is defined through the globe element at the south pole. A passage means 82 extends diametrically through globe element 14 for connecting north bore 78 to south bore 80 and for accommodating axle 16 through globe element 14.

The globe element will show basic geographic data, and will be modified as needed for a particular presentation. For example, if the globe unit is being used as a visual aid in a history presentation, political boundaries, maps and the like will be overlaid on the basic geographic data shown in the globe element. These political boundaries will be changed according to the history facts being presented. As those skilled in the art will understand, other overlays, such as scientific, environmental, or the like can also be used. In fact, the globe can be updated to account for changing political boundaries on a current basis. This updating can be made in conjunction with an atlas or a binder or the like.

In order to effect the just-mentioned overlay procedure, globe unit 10 includes a plurality of translucent covers, such as northern hemispherical cover 18 and southern hemispherical cover 20. Each of the covers includes an inner surface 90 on which geographic markings are placed. These geographic markings include political boundaries, historical boundaries, and the like and will be used in conjunction with the data and indicia on the globe unit during a presentation. The hemispherical covers are identical in ways that one skilled in the art will understand, and any differences will also be understood by one skilled in the art. Therefore, only hemispherical cover 18 will be discussed, it being understood that cover 20 will be a mirror image, with the exception of geographic markings.

Cover 18 includes an outer surface 92 having means thereon for receiving printed indicia, such as arrow 93, or the like, such as would be made with a marking pen or the like. This means can be plastic substrate or the like, and the markings can be made in an erasable manner. Cover 18 further includes a rim 94 which is circular and located to coincide with equator 66 when cover 18 is in place on globe element 14. Cover 18 is sized to encase northern hemisphere 70, and has a center 96 coinciding with north pole 74 when the cover 18 is in place, and a cover bore 98 defined through the cover at center 96. A reinforcing washer 100 is mounted on the cover adjacent to the bore 98. Cover 18 has an inner diameter measured at rim 94 that is essentially equal to, but slightly greater than, the outer diameter of the globe element at the equator whereby cover 18 will encase the northern hemisphere 70 when the cover is in place on the globe element.

The globe element, the covers and the axle are all assembled and fastened to each other by releasable fastening means which permits the globe unit 10 to be quickly and accurately assembled and disassembled. The fastening means includes a bottom fastener element 102 which is received through hole 42 and a top fastener element 104 which is received through hole 40. Fastener elements 102 and 104 are internally threaded in the preferred form of the invention. First and second end elements 52 and 54 are externally threaded to cooperate with the internal threads on the elements 102 and 104 whereby axle 16 is securely held in place in the support rib as is indicated in FIG. 4. Axle 16 passes through globe element 14 and through covers 18 and 20 mounted thereon to fix the combined globe element and covers on support stand unit 12 to rotate about the central axis thereof. Axle 16 passes through globe element 14 north and south bores as well as through the bores in the covers to fix those elements to the axle at the poles. The elements 102 and 104 are bushing-like and have flanges, such as flange 105, which engage the support rib adjacent to the bores 40 and 42. When the axle is threadably engaged with the elements 102 and 104, it is securely held in place in the support rib.

The fastening means includes friction means for fixing the covers in covering relationship with globe element 14 as indicated in FIG. 4. As is best shown in FIG. 1, the friction means includes a tab 110 fixed to the globe element to extend longitudinally of the globe element and to be longitudinally bisected by equator 66 so that one-half of the tab is located in the northern hemisphere and one-half of the tab is located in the southern hemisphere. In the preferred form of the invention, tab 110 is one-fourth inch long. As indicated in FIG. 4, tab 110 has sides 112 and 114 that are spaced apart by the width of the tab.

Each cover includes a slot, such as slot 116 in cover 18, that extends from rim 94 towards the pole along a longitudinal direction of the cover. Each slot has a top end, such as end 118 of slot 116 and sides 120 and 122 which are spaced apart by the width dimension of the slot. The length dimension of the slot is defined between rim 94 and end 118, while the width dimension of the slot is defined between sides 120 and 122. The width dimension of the slot is essentially equal to, but slightly larger than, the width dimension of the tab so the tab sides 120 and 122 frictionally engage the cover adjacent to the slot to hold the cover in position on the globe element.

It is understood that while certain forms of the present invention have been illustrated and described herein, it is not to be limited to the specific forms or arrangements of parts described and shown.

I claim:

1. A changeable globe unit comprising:

A) a support stand unit having
      (1) a base means for resting on a support surface and supporting the globe unit,
      (2) a pedestal having a proximal end mounted on said base means and extending upward therefrom when said base means in resting on the support surface, and a distal end spaced above said base means,
      (3) a support rib having a bottom end located near said distal end, a top end spaced from said bottom end, and an arcuate body connecting said top end to said bottom end, said distal end being connected to said arcuate body adjacent to said bottom end, and
      (4) a top bore defined through said top end and a bottom bore defined through said bottom end;

B) an axle having
      (1) a cylindrical body with an outer diameter and first and second ends, and
      (2) first and second cylindrical end elements on said cylindrical body first and second ends respectively and extending outwardly therefrom, each of said cylindrical end elements having an outer diameter which is smaller than the body outer diameter;

C) a printed geographic globe element having
      (1) a globe outer surface,
      (2) basic geographic indicia on said globe outer surface, (3) an equator laterally surrounding said outer surface and dividing said globe element into a northern hemisphere and a southern hemisphere,
(4) a north pole,
(5) a south pole longitudinally spaced from said north pole and diametrically opposed to said north pole,
(6) a north bore defined through said outer surface at said north pole,
(7) a south bore defined through said outer surface at said south pole, and
(8) passage means through said globe unit connecting said north pole to said south pole for accommodating said axle through said globe element;

D) a plurality of translucent northern hemispherical covers, each including
(1) an inner surface and geographic markings on said inner surface,
(2) an outer surface having means thereon for erasably receiving printed indicia,
(3) a rim,
(4) a cover bore located at the center of said northern hemisphere inner surface,
(5) a washer mounted on said cover adjacent to said bore,
(6) said northern hemispherical cover having an inner diameter at said rim which exceeds the outer diameter of said globe element at said equator whereby said northern hemispherical cover encases said globe element northern hemisphere;

E) a plurality of translucent southern hemispherical covers, each including
(1) an inner surface and geographic markings on said inner surface,
(2) an outer surface having means thereon for erasably receiving printed indicia,
(3) a rim,
(4) a cover bore located at the center of said southern hemisphere inner surface,
(5) a washer mounted on said cover adjacent to said bore,
(6) said southern hemispherical cover having an inner diameter at said rim which exceeds the outer diameter of said globe element at said equator whereby said southern hemispherical cover encases said globe element southern hemisphere; and F) fastening means for releasably fastening said globe element to said support stand unit and one northern hemispherical cover to said globe element and one southern hemispherical cover to said globe element, said fastening means including
(1) a bottom fastener element in the bottom end of said support rib,
(2) a top fastener element in the top end of said support rib,
(3) first means on the first cylindrical end element of said axle which cooperates with said bottom fastener element for releasably attaching said axle to said support stand unit,
(4) second means on the second cylindrical end element of said axle which cooperates with said top fastener element for releasably attaching said axle to said support stand unit,
(5) a tab on the outer surface of said globe element, said tab being located at said equator, and extending longitudinally of said globe element, with said equator bisecting said tab whereby one-half of said tab is located in said northern hemisphere and one-half of said tab is located in said southern hemisphere, said tab having a width dimension extending laterally of said globe element and sides,
(6) a slot defined in said one northern hemispherical cover and extending from said rim longitudinally of said one northern hemisphere cover toward said northern hemisphere cover bore, said slot having a width dimension that is essentially equal to the width dimension of said tab and a length dimension as measured from said rim which is essentially equal to one-half the length dimension of said tab whereby said tab is snugly received in said slot and has the sides thereof frictionally engaged with said northern hemisphere adjacent to said slot, said northern hemispherical cover bore being located to be concentric with said globe element north bore when said tab is received in said slot, whereby said axle extends through north bore and through said northern hemispherical cover bore when said northern hemispherical cover is in covering relationship with said globe northern hemisphere, and
(7) a slot defined in said one southern hemispherical cover and extending from said rim longitudinally of said one southern hemisphere cover toward said southern hemisphere cover bore, said slot having a width dimension that is essentially equal to the width dimension of said tab and a length dimension as measured from said rim which is essentially equal to one-half the length dimension of said tab whereby said tab is snugly received in said slot and has the sides thereof frictionally engaged with said southern hemisphere adjacent to said slot, said southern hemispherical cover bore being located to be concentric with said globe element north bore when said tab is received in said slot, whereby said axle extends through north bore and through said southern hemispherical cover bore when said southern hemispherical cover is in covering relationship with said globe southern hemisphere.

2. The changeable globe unit defined in claim 1 wherein said tab is one-fourth inch long.

3. The changeable globe unit defined in claim 2 wherein said northern and southern hemispherical cover geographical markings include historical markings.

4. The changeable globe unit defined in claim 2 wherein said northern and southern hemispherical cover geographical markings include political markings.

5. The changeable globe unit defined in claim 2 wherein said northern and southern hemispherical cover geographical markings include environmental markings.

* * * * *